United States Patent
McGuigan et al.

(10) Patent No.: US 12,315,289 B2
(45) Date of Patent: May 27, 2025

(54) LATENT PRINT EXTRACTION APPARATUS AND METHOD

(71) Applicant: UNIVERSITY OF EXETER, Exeter (GB)

(72) Inventors: Matthew McGuigan, Exeter (GB); Jacqueline Christmas, Exeter (GB)

(73) Assignee: UNIVERSITY OF EXETER, Exeter (GB)

( * ) Notice: Subject to any disclaimer, the term of this patent is extended or adjusted under 35 U.S.C. 154(b) by 0 days.

(21) Appl. No.: 18/580,230

(22) PCT Filed: Jul. 22, 2022

(86) PCT No.: PCT/GB2022/051928
§ 371 (c)(1),
(2) Date: Jan. 18, 2024

(87) PCT Pub. No.: WO2023/007132
PCT Pub. Date: Feb. 2, 2023

(65) Prior Publication Data
US 2024/0312244 A1    Sep. 19, 2024

(30) Foreign Application Priority Data

Jul. 28, 2021  (GB) ..................... 2110863

(51) Int. Cl.
*G06V 40/12*   (2022.01)
*G06T 5/80*    (2024.01)
(Continued)

(52) U.S. Cl.
CPC ............ *G06V 40/1359* (2022.01); *G06T 5/80* (2024.01); *G06V 10/145* (2022.01); *G06V 10/24* (2022.01); *G06V 10/60* (2022.01); *G06V 40/1318* (2022.01)

(58) Field of Classification Search
CPC .. G06V 40/1359; G06V 10/145; G06V 10/24; G06V 10/60; G06V 40/1318; G06T 5/80
See application file for complete search history.

(56) References Cited

U.S. PATENT DOCUMENTS

2019/0205589 A1    7/2019   Lo et al.

OTHER PUBLICATIONS

Askarin et al ("Reduced contact lifting of latent fingerprint from curved surfaces", Journal of Information Security and Applications vol. 53, May 1, 2020) (Year: 2020).*

(Continued)

*Primary Examiner* — Jonathan A Boyd
(74) *Attorney, Agent, or Firm* — Notaro, Michalos & Zaccaria P.C.

(57) ABSTRACT

A latent print extraction apparatus is described. An input receives an image of light reflected from a curved surface. A comparison unit compares a shape of the reflected light in the image to an expected shape of light reflected from a flat surface and thereby determines an estimated curvature for the curved surface. A correction unit corrects curvature distortions of an image of a latent print on the curved surface based on the estimated curvature. The latent print extraction apparatus allows the calculation of a value for the curvature of the curved surface to be done remotely, without the need to physically measure the surface. This saves time and avoids accidentally or otherwise contacting any latent prints when measuring the curvature of the surface.

20 Claims, 10 Drawing Sheets

(51) Int. Cl.
    *G06V 10/145*     (2022.01)
    *G06V 10/24*     (2022.01)
    *G06V 10/60*     (2022.01)
    *G06V 40/13*     (2022.01)

(56) References Cited

OTHER PUBLICATIONS

PCT International Search Report and Written Opinion for Appl. No. PCT/GB2022/051928 dated Nov. 11, 2022.
International Application Status Report for Appl. No. PCT/GB2022/051928 retrieved Jan. 15, 2024.
UK Search Report for Application No. GB2110863.4 dated Apr. 28, 2022.
Askarin, Mohammad Mogharen, et al.; "Reduced contact lifting of latent fingerprints from curved surfaces"; Journal of Information Security and Applications 2020; 53:2-4.
Mcguigan, Matthew, et al.; "Remote Extraction of Latent Fingerprints (RELF)"; International Joint Conference on Neural Networks (IJCNN) 2020; pp. 1-8.

\* cited by examiner

LATENT PRINT EXTRACTION APPARATUS AND METHOD

TECHNICAL FIELD OF THE INVENTION

The present invention relates to a latent print extraction apparatus and method.

BACKGROUND TO THE INVENTION

It is common to use prints (particularly fingerprints, but also palmprints and other parts of a person's body with unique ridge formations thereon) found at crime scenes or otherwise connected to crimes as evidence in criminal cases, and to use them in information security as well. Unknown prints are compared to a known print (i.e. a print which is known to belong to a particular person), and a match indicates that the unknown print belongs to the particular person with which the known print is associated.

There are several methods for comparing unknown prints to known prints, but one common method is to run the unknown print through the latent print matching system developed by the National Institute of Standards and Technology (NIST), and used by the Federal Bureau of Investigation (FBI) and Department of Homeland Security, the NIST biometric image software (NBIS). NBIS uses the minutiae extractor MINDTCT, which extracts the location of each minutiae point in an image, as well as its orientation and type. It then compares the minutiae points to corresponding minutiae points of a known latent print, and notes any matches between corresponding minutiae points. The NBIS clusters all linked pairs of matched minutiae points and uses the length of the longest chain to provide a score.

The minutiae points are the major features of the latent print, which can be compared to corresponding minutiae points of known prints to identify the latent print. Examples of minutiae points include the positions of the termination of particular ridges, or the positions of bifurcations of ridges. The more minutiae points which can be matched between a print and an known print, the higher the degree of confidence that the print matches the known print.

Commonly the print to be identified (particularly when the print is evidence connected to a crime) is a latent print, formed by dielectric residue left behind on a surface when the ridges forming the print contact and then move off the surface—the dielectric residue taking the form of water with various salts and minerals in. Most latent prints will not be a perfect replica of the print formed by the ridges, since in some areas sufficient dielectric residue may not be transferred and/or the pattern may degrade over time. This can lower the match score between the latent print and the known print. Further to the above, if the latent print is on a curved surface the distances between different minutiae points (and indeed the minutiae points themselves) may be distorted. This can further lower the match score. The lower the degree of confidence in the match between the latent print and a known print, the more open the identification of the latent print is to being challenged in court.

Latent prints are almost invisible, and so specially designed methods must be taken to obtain an image of the latent print which can then be matched with a known print. Several current methods involve depositing a fine dust material on the latent print or exposing the latent print to vapours from superglue, to make it visible. These methods can degrade the latent print due to the contact with it, and the contact can also mean it is difficult or impossible to obtain other forms of evidence from the latent print (for example, DNA).

To avoid contact with the latent print, other methods involve merely taking images of the latent print without applying any material to the latent print, relying on lighting to enhance the visibility of the latent print. While these other methods avoid contacting the latent print in relation to obtaining an image of it, they run into the different problem when capturing images of latent prints from specular surfaces. Such surfaces are difficult to illuminate correctly such that the entirety of the latent print can be seen, since specular surfaces do not reflect light uniformly.

All the methods of obtaining an image of latent prints discussed above account for the curvature distortion by hand measuring the curvature of the curved surface. The resulting contact with the surface risks degrading the quality of the latent print via accidental or necessary contact with it. Contact can also contaminate the latent print, meaning a useful DNA sample cannot be obtained from it. Finally, it is time consuming to measure the curvature by hand.

Embodiments of the present invention seek to overcome/ameliorate these or other disadvantages.

SUMMARY OF THE INVENTION

According to a first aspect of the present invention there is provided a latent print extraction apparatus comprising: an input operable to receive an image of light reflected from a curved surface; a comparison unit operable to compare a shape of the reflected light in the image to an expected shape of light reflected from a flat surface and thereby determine an estimated curvature for the curved surface; and a correction unit operable to correct curvature distortions of an image of a latent print on the curved surface based on the estimated curvature.

The latent print extraction apparatus means calculation of a value for the curvature of the curved surface can be done remotely, without the need to physically measure the surface. This saves time, and avoids accidentally or otherwise contacting any latent prints when measuring the curvature of the surface. As such, the apparatus is faster to use and means the image of the latent print can be corrected for curvature distortions (so resulting in a better match when comparing the corrected latent print to a known print) while also avoiding degrading or contaminating the latent print when making the curvature estimation.

The latent print extraction apparatus may comprise a lighting unit operable to apply light to the curved surface. The lighting unit may be operable to generate light with a circular profile. In particular, the lighting unit may be operable to generate light with a ring profile. The lighting unit may comprise a ring of light sources. Each light source may be a light emitting diode.

The lighting unit means the apparatus can dictate the shape of the light reflected from the curved surface, and so the expected shape of the light when reflected from a flat surface can be easily known. By generating light with a circular profile, the shape of the reflected light is also circular. It is easier to estimate curvature of the curved surface when comparing a circular shape of light on the curved surface to the expected circular shape of light on the curved surface. It is particularly easy to determine the shape of a ring of reflected light.

The latent print apparatus may comprise a camera operable to capture the image of light reflected from a curved surface. The camera may form part of the lighting unit. The camera may be positioned in line with the centre of the ring of light sources. The camera may be directed to be operable to capture images wherein the centre of the images align with the centre of the ring of light sources.

By providing the camera as part of the lighting unit, the camera and light sources can be provided as one unit, and so the apparatus is easier to set up. The camera being positioned in line with the centre of the ring of light sources means it is relatively easy to take images whose centres align with the centres of the rings of light sources. The images having centres which align with the centres of the rings of light sources mean the shape of the reflected ring of light in the image is dictated solely by the curvature of the surface, and not partly by the relative positions of the camera and the ring of light sources.

The lighting unit may comprise a plurality of rings of light sources. The lighting unit may comprise a light dome. The plurality of rings may form the light dome. The camera may be positioned at the top of the light dome. The camera may be positioned at the apex of the light dome. The camera may be directed to be operable to capture images out of the bottom of the dome. The light dome may be handheld.

A light dome means the latent print extraction apparatus has the lighting necessary for multi-light imaging. Such imagining takes multiple images of the same scene (in the present invention, the same area of the curved surface), wherein for each image the scene is illuminated from a different direction. Multi-light imaging compensates for the irregular reflections from specular surfaces, since the image of the entire latent print can be pieced together from partial views in the different multi-light images.

The comparison unit may be operable to fit an ellipse to the shape of the reflected light in the image. The ellipse may fit to the outline of the circular shape of the reflected light in the image. The ellipse may fit to the ring shape of the reflected light in the image. The comparison unit may be operable to calculate the semi-major and semi-minor axes of the ellipse. The comparison unit may be operable to calculate the eccentricity of the shape of the reflected light. The comparison unit may be operable to calculate the eccentricity of the ellipse. The comparison unit may be operable to calculate the eccentricity of the ellipse using the following formula:

$$e_0 = \sqrt{1 - \frac{B^2}{A^2}}$$

wherein $e_0$ is the calculated eccentricity, A is the semi-major axis of the ellipse, and B is the semi-minor axis of the ellipse.

The comparison unit may be operable to compare the calculated eccentricity to a table of eccentricity versus radius of curvature of a surface to determine the estimated curvature of the curved surface, to thereby compare the shape of the reflected light to the expected shape of light from a flat surface. The comparison unit may be operable to store a table of eccentricity versus radius of curvature of a surface. The comparison unit may be operable to compare the calculated eccentricity to a graph of eccentricity versus radius of curvature of a surface to determine the estimated curvature of the curved surface. The comparison unit may be operable to store a graph of eccentricity versus radius of curvature of a surface. The comparison unit may be operable to compare the calculated eccentricity to the table and/or graph when the calculated eccentricity indicates the curved surface is not spherical. The comparison unit may be operable to compare the calculated eccentricity to the table and/or graph when the calculated eccentricity is not equal to zero.

Eccentricity of a reflected shape of light is caused by the curved surface being more curved along one axis than another, perpendicular axis. As such, given the vast majority of surfaces which have different curvatures are cylindrical (i.e. they are curved along one axis and not curved along a perpendicular axis which extends along the length) the eccentricity indicates the curvature of the surface.

The calculated eccentricity not being equal to zero means the curved surface has a curvature along one axis which differs from the curvature in a perpendicular axis. The latent print extraction apparatus can use the calculated eccentricity not being equal to zero as a relatively easy to obtain indication the surface is cylindrical, on the basis that most curved surfaces which have differing curvatures along perpendicular axes are cylindrical.

The latent print extraction apparatus may comprise an orientation unit operable to determine an orientation of the curvature of the curved surface. The orientation unit may be operable to determine the orientation using the orientation formula:

$$\theta = \tan^{-1}\left(\frac{c - a - \sqrt{(a-c)^2 + b^2}}{b}\right)$$

wherein θ angle of the direction of the curvature of the curved surface which respect to the horizontal of the image, and a, b, and c are parameters of the ellipse.

By being operable to determine the orientation of the curvature of the curved surface, the latent print extraction apparatus can determine the axis of the image along which the curvature correction should be applied.

The orientation unit may be operable to orientate the image of the latent print on the curved surface based on the determined orientation so that the horizontal of the image of the latent print on the curved surface aligns with the curvature of the curved surface.

By being operable to orientate the image in this way, it is easier for the latent extraction apparatus to apply the curvature correction, since it need just be applied along the horizontal.

The comparison unit may be operable to determine the radius of the shape of the reflected light. The comparison unit may be operable to determine the radius of the shape of the reflected light when the calculated eccentricity is equal to zero. The comparison unit may be operable to determine the radius of the ellipse. The comparison unit may be operable to determine the radius of the ellipse when the calculated eccentricity indicates the curved surface is spherical. The comparison unit may be operable to determine the radius of the ellipse when the calculated eccentricity is equal to zero. The comparison unit may be operable to compare the determined radius to the expected radius of the shape of the light when reflected from a flat surface to determine the estimated curvature of the curved surface.

For spherical surfaces, the curvature is the same along all axis of the surface. As such, the eccentricity of any reflected circular shape will be zero. As such, the comparison unit can determine the surface is spherical based on the relatively easy to establish fact that the eccentricity of reflected light is zero.

A spherical surface reduces the radius of a circular shape of light from the expected radius of circular light when reflected from a flat surface, the extent of the reduction in the radius being proportional to the curvature of the surface.

The latent print extraction apparatus may comprise a boundary estimation unit operable to estimate the boundary of the curved surface within the image of the latent print on the curved surface. The boundary estimation unit may be operable to estimate the boundary of the curved surface within the image of the latent print on the curved surface by estimating the boundary of the curved surface within the image of light reflected from a curved surface.

The correction unit may be operable to apply a cylindrical correction formula to each point in the image of the latent print on the curved surface. The correction unit may be operable to apply the cylindrical correction formula when the calculated eccentricity is not equal to zero. The cylindrical correction formula may be as follows:

$$P_{cylindrical\ corrected} = R_{curvature} \sin^{-1}\left(\frac{P_{cylindrical\ distorted}}{R_{curvature}}\right)$$

wherein $P_{cylindrical\ distorted}$ is a position of the point in the image of the latent print on the curved surface, $R_{curvature}$ is the estimated curvature of the curved surface, and $P_{cylindrical\ corrected}$ is the new position of the point in the corrected image of the latent print on the curved surface. The correction unit may be operable to apply the cylindrical correction formula to each point when the calculated eccentricity is not equal to zero. $P_{cylindrical\ distorted}$ may be the position of the point in the image relative to a central line along a length of the image of cylindrical surface. $P_{cylindrical\ distorted}$ may be the position of the point in the image relative to a central line on the image, the central line running perpendicular to the curvature of the curved surface. $P_{cylindrical\ distorted}$ may be the length of a line running from the point in the image to a central line along a length of the image of cylindrical surface, the line being perpendicular to the central line. $P_{cylindrical\ corrected}$ may be the position of the point in the corrected image relative to a central line of the image, the central line running perpendicular to the curvature of the curved surface. $P_{cylindrical\ corrected}$ may be the position of the point in the corrected image relative to a central line along a length of the image of cylindrical surface. $P_{cylindrical\ corrected}$ may be the length of a line running from the point in the corrected image to a central line along a length of the image of cylindrical surface, the line being perpendicular to the central line.

The correction unit may be operable to determine the position of the central line based on the estimated boundary. The central line may be determined to be the mid-line between two sides of the estimated boundary. The central line may be determined to be the mid-line between two long sides of the estimated boundary.

The correction unit may be operable to apply a spherical correction formula to the image of the latent print on the curved surface. The spherical correction formula may be the pincushion distortion. The correction unit may be operable to apply the spherical correction formula when the calculated eccentricity is equal to zero. The correction unit may be operable to apply the following formula to each point in the image of the latent print on the curved surface to apply the pincushion distortion:

$$P_{spherical\ corrected} = P_{spherical\ distorted}\left(1 + kP_{spherical\ distorted}^2\right)$$

wherein $P_{spherical\ corrected}$ is the position of the point relative to the centre of the curved surface in the corrected image, $P_{spherical\ distorted}$ is the position of the point relative to the centre of the curved surface of the latent print, and k is the distortion parameter which is inversely proportional to the radius of the curvature. $P_{spherical\ corrected}$ may be the distance between the point and the centre of the curved surface in the corrected image. $P_{spherical\ distorted}$ may be the distance between the point and the centre of the curved surface in the image.

The lighting unit may be operable to capture images via multi-light imaging. The lighting unit may comprise a plurality of light sources. Each light source may be in a different position with respect to the camera. The lighting unit may be operable to turn each light source on and off in sequence. The camera may be operable to capture a plurality of images, each image being captured with a different light source and/or combination of light sources turned on.

The latent print apparatus may comprise an image analysis unit operable to segment each image captured via multi-light imaging into super-pixels. The image analysis unit may be operable to segment each image captured via multi-light imaging into super-pixels using a gradient ascent algorithm. The image analysis unit may be operable to segment each image captured via multi-light imaging into super-pixels using simple linear iterative clustering (SLIC).

The image analysis unit may be operable to perform histogram equalisation on the super-pixels. The image analysis unit may be operable to perform a fast Fourier transform (FFT) on each super-pixel to extract a value for the number of print ridges in the super-pixel. The image analysis unit may be operable to perform a fast Fourier transform (FFT) on each super-pixel to extract the dominant spatial frequency in each super-pixel. The image analysis unit may be operable to extract a value for the number of print ridges in the super-pixel by counting the number of peaks of the dominant spatial frequency in each super-pixel.

The image analysis unit may be operable to calculate a cross correlation of each super-pixel with a filter for the latent print. The image analysis unit may be operable to measure the orientation of the dominant spatial frequency of each super-pixel in relation to the horizontal of the image from which the super-pixel was obtained. The image analysis unit may be operable to generate a filter based on the dominant spatial frequency. The filter may be a sinusoidal filter. The image analysis unit may be operable to calculate the cross correlation of each super-pixel with the filter. The image analysis unit may be operable to orientate the super-pixel such that the direction of the dominant spatial frequency is aligned with the horizontal of the image from which the super-pixel was obtained. The image analysis unit may be operable to compute the number of ridges in the super-pixel. The image analysis unit may be operable to compute the number of ridges in the orientated super-pixel. The image analysis unit may be operable to count the number of peaks in the super-pixel, thereby to determine the number of ridges in the super-pixel.

The image analysis unit may be operable to input the calculated cross correlation into a machine learning algorithm.

The image analysis unit may be operable to segment each image captured via multi-light imaging into a large enough number of super-pixels that super-pixels containing part of a central region of a latent print have a high similarity with the filter.

The image analysis unit may be operable to compute the gray-level co-occurrence matrix (GLCM) for each super-pixel. The image analysis unit may be operable to extract one or more numeric features from the GLCM. The image analysis unit may be operable to extract one or more numeric features from the GLCM for each super-pixel. The image analysis unit may be operable to extract a contrast value, measuring the intensity contrast between a pixel and its neighbour over the entire super-pixel, from the GLCM for each super-pixel. The image analysis unit may be operable to extract a correlation value, measuring how correlated each pixel is to its neighbour over the entire super-pixel, from the GLCM for each super-pixel. The image analysis unit may be operable to extract an energy yield value, measuring the sum of squared elements in the GLCM, from the GLCM for each super-pixel. The image analysis unit may be operable to extract a homogeneity value, measuring the closeness of elements in the GLCM to the GLCM diagonal, from the GLCM for each super-pixel. The image analysis unit may be operable to feed the one or more numeric features into the machine learning algorithm.

The image analysis unit may be operable to compute the ratio of non-zero value to zero value pixels in each super-pixel. The image analysis unit may be operable to compute the aspect ratio of the dimensions of each super-pixel. The image analysis unit may be operable to compute the ratio of perimeter over area of each super-pixel. The image analysis unit may be operable to compute the ratio of convex hull over perimeter for each super-pixel. The image analysis unit may be operable to compute the variance in intensity across each super-pixel. The image analysis unit may be operable to compute the median intensity value of each super-pixel. The image analysis unit may be operable to compute the mode intensity value of each super-pixel. The image analysis unit may be operable to compute the entropy of each super-pixel.

The image analysis unit may be operable to form a feature vector for each super-pixel. The feature vector may be a one-dimensional feature vector. The feature vector may be a 14×1 feature vector. The feature vector may include any and/or all of the following: the cross-correlation of the super-pixel with the filter, the number of ridges present in the super-pixel, ratio of non-zero value to zero value pixels, the aspect ratio of the dimensions, the ratio of perimeter over area, ratio of convex hull over perimeter, the variance in intensity, the median intensity value, the mode intensity value, the entropy value, the contrast value, the correlation value, the energy yield value, and/or the homogeneity value.

The image analysis unit may be operable to feed the feature vector for each super-pixel into the machine learning algorithm. The image analysis unit may be operable to use the machine learning algorithm to identify super-pixels which contain part of the latent print, based on the respective feature-vector. The image analysis unit may be operable to build the image of the latent print on the curved surface from super-pixels identified as containing part of the latent print. The image analysis unit may be operable to mosaic the super-pixels identified as containing part of the latent print to build the image of the latent print on the curved surface.

One or more of the units of the latent print extraction apparatus may be operable in a sequential order. Each unit of the latent print extraction apparatus may be operable in a sequential order. The latent print extraction apparatus may be operable to progress along the sequential order automatically.

According to a second aspect of the present invention there is provided a method of latent print extraction, comprising the steps of: receiving an image of light reflected from a curved surface; comparing a shape of the reflected light in the image to an expected shape of light reflected from a flat surface and thereby determining an estimated curvature for the curved surface; and correcting curvature distortions of an image of a latent print on the curved surface based on the estimated curvature.

The latent print extraction method means calculation of a value for the curvature of the curved surface can be done remotely, without the need to physically measure the surface. This saves time, and avoids accidentally or otherwise contacting any latent prints when measuring the curvature of the surface. As such, the method is faster to use and means the image of the latent print can be corrected for curvature distortions (so resulting in a better match when comparing the corrected latent print to a known print) while also avoiding degrading or contaminating the latent print when making the curvature estimation.

The method may comprise the step of applying light to the curved surface. The method may comprise the step of applying light with a circular profile to the curved surface. The method may comprise the step of applying light with a ring profile to the curved surface. The method may comprise the step of capturing the image of light reflected from a curved surface.

Applying light to the surface means the method can dictate the shape of the light reflected from the curved surface, and so the expected shape of the light when reflected from a flat surface can be easily known. By applying light with a circular profile, the shape of the reflected light is also circular. It is easier to estimate curvature of the curved surface when comparing a circular shape of light on the curved surface to the expected circular shape of light on the curved surface. It is particularly easy to determine the shape of a ring of reflected light.

The comparison may comprise fitting an ellipse to the shape of the reflected light in the image. The ellipse may be fit to the outline of the circular shape of the reflected light in the image. The ellipse may be fit to the ring shape of the reflected light in the image. The comparison may comprise calculating the semi-major and semi-minor axes of the ellipse. The comparison may comprise calculating the eccentricity of the ellipse. The comparison may comprise calculating the eccentricity of the ellipse using the eccentricity formula:

$$e_0 = \sqrt{1 - \frac{B^2}{A^2}}$$

wherein $e_0$ is the calculated eccentricity, A is the semi-major axis of the ellipse, and B is the semi-minor axis of the ellipse.

The comparison may comprise comparing the calculated eccentricity to a graph of eccentricity versus radius of curvature of a surface to determine the estimated curvature of the curved surface. The comparison may comprise comparing the calculated eccentricity to a table of eccentricity versus radius of curvature of a surface to determine the estimated curvature of the curved surface. The comparison may comprise comparing the calculated eccentricity to the graph and/or table when the calculated eccentricity indicates the curved surface is not spherical. The comparison may comprise comparing the calculated eccentricity to the graph and/or table when the calculated eccentricity is not equal to zero.

Eccentricity of a reflected shape of light is caused by the curved surface being more curved along one axis than another, perpendicular axis. As such, given the vast majority of surfaces which have different curvatures are cylindrical (i.e. they are curved along one axis and not curved along a perpendicular axis which extends along the length) the eccentricity indicates the curvature of the surface.

The calculated eccentricity not being equal to zero means the curved surface has a curvature along one axis which differs from the curvature in a perpendicular axis. The latent print extraction method can use the calculated eccentricity not being equal to zero as a relatively easy to obtain indication the surface is cylindrical, on the basis that most curved surfaces which have differing curvatures along perpendicular axes are cylindrical.

The method may comprise the step of determining the orientation of the curvature of the curved surface. The method may determine the orientation using the orientation formula:

$$\theta = \tan^{-1}\left(\frac{c - a - \sqrt{(a-c)^2 + b^2}}{b}\right)$$

wherein θ angle of the direction of the curvature of the curved surface which respect to the horizontal of the image, and a, b, and c are parameters of the ellipse.

By determining the orientation of the curvature of the curved surface, the latent print extraction method can determine the axis of the image along which the curvature correction should be applied.

The method may comprise the step of orientating the image of the latent print on the curved surface based on the determined orientation so that the horizontal of the image of the latent print on the curved surface aligns with the curvature of the curved surface.

By orientating the image in this way, it is easier for the latent extraction method to apply the curvature correction, since it need just be applied along the horizontal.

The comparison may comprise determining the radius of the ellipse. The comparison may comprise determining the radius of the ellipse when the calculated eccentricity indicates the curved surface is spherical. The comparison may comprise determining the radius of the ellipse when the calculated eccentricity is equal to zero. The comparison may comprise comparing the determined radius to the expected radius of the shape of the light when reflected off a flat surface to determine the estimated curvature of the curved surface.

The method may comprise the step of estimating the boundary of the curved surface within the image of the latent print on the curved surface.

Correcting curvature distortions may comprise applying a cylindrical correction formula to each point in the image of the latent print on the curved surface, the cylindrical correction formula being:

$$P_{cylindrical\,corrected} = R_{curvature} \sin^{-1}\left(\frac{P_{cylindrical\,distorted}}{R_{curvature}}\right)$$

wherein $P_{cylindrical\,distorted}$ is a position of the point in the image of the latent print on the curved surface, $R_{curvature}$ is the estimated curvature of the curved surface, and $P_{cylindrical\,corrected}$ is the new position of the point in the corrected image of the latent print on the curved surface. Correcting may comprise applying the formula to each point when the calculated eccentricity is not equal to zero. $P_{cylindrical\,distorted}$ may be the position of the point in the image relative to a central line on the image, the central line running perpendicular to the curvature of the curved surface. $P_{cylindrical\,distorted}$ may be the position of the point in the image relative to a central line along the length of the image of the cylindrical surface. $P_{cylindrical\,corrected}$ may be the position of the point in the corrected image relative to a central line of the image, the central line running perpendicular to the curvature of the curved surface. $P_{cylindrical\,corrected}$ may be the position of the point in the corrected image relative to a central line along the length of the image of the cylindrical surface.

Correcting curvature distortions may comprise applying a spherical correction formula to the image of the latent print on the curved surface. The spherical correction formula may be a pincushion distortion. Correcting curvature distortions may comprise applying the pincushion distortion when the calculated eccentricity is equal to zero. Correcting curvature distortions may comprise applying the spherical correction formula to each point in the image of the latent print on the curved surface to apply the pincushion distortion, the spherical correction formula being:

$$P_{spherical\,corrected} = P_{spherical\,distorted}\left(1 + kP^2_{spherical\,distorted}\right)$$

wherein $P_{spherical\,corrected}$ is the position of the point relative to the centre of the curved surface in the corrected image, $P_{spherical\,distorted}$ is the position of the point relative to the centre of the curved surface of the latent print, and k is the distortion parameter which is inversely proportional to the radius of the curvature.

The method may comprise the step of capturing images via multi-light imaging. Capturing images may comprise turning a plurality of light source on and off in sequence. Capturing images may comprise capturing a plurality of images, each image being captured with a different light source and/or combination of light sources turned on.

The method may comprise segmenting each image captured via multi-light imagining into super-pixels. Segmenting each image may comprise using a gradient ascent algorithm. Segmenting each image may comprise using simple linear iterative clustering (SLIC).

The method may comprise performing histogram equalisation on the super-pixels. The method may comprise performing a fast Fourier transform (FFT) on each super-pixel to extract a value for the number of print ridges in the super-pixel. The method may comprise performing a fast Fourier transform (FFT) on each super-pixel to extract a value for the dominant spatial frequency in each super-pixel.

The method may comprise calculating a cross correlation of each super-pixel with a filter for the latent print. The method may comprise measuring the orientation of the dominant spatial frequency of each super-pixel in relation to the horizontal of the image from which the super-pixel was obtained. The method may comprise generating a filter based on the dominant spatial frequency. The filter may be a sinusoidal filter. The method may comprise calculating the cross correlation of each super-pixel with the filter. The method may comprise calculating a cross correlation of each super-pixel with a filter for the latent print.

The method may comprise inputting the calculated cross correlation into a machine learning algorithm.

The method may comprise segmenting each image captured via multi-light imaging into a large enough number of super-pixels that super-pixels containing part of a central region of a latent print have a high similarity with the filter.

The method may comprise computing the gray-level co-occurrence matrix (GLCM) for each super-pixel. The method may comprise extracting one or more numeric features from the GLCM. The method may comprise extracting one or more numeric features from the GLCM for each super-pixel. The method may comprise extracting a contrast value, measuring the intensity contrast between a pixel and its neighbour over the entire super-pixel, from the GLCM for each super-pixel. The method may comprise extracting a correlation value, measuring how correlated each pixel is to its neighbour over the entire super-pixel, from the GLCM for each super-pixel. The method may comprise extracting an energy yield value, measuring the sum of squared elements in the GLCM, from the GLCM for each super-pixel. The method may comprise extracting a homogeneity value, measuring the closeness of elements in the GLCM to the GLCM diagonal, from the GLCM for each super-pixel. The method may comprise feeding the one or more numeric features into the machine learning algorithm.

The method may comprise computing the ratio of non-zero value to zero value pixels in each super-pixel. The method may comprise computing the aspect ratio of the dimensions of each super-pixel. The method may comprise computing the ratio of perimeter over area of each super-pixel. The method may comprise computing the ratio of convex hull over perimeter for each super-pixel. The method may comprise computing the variance in intensity across each super-pixel. The method may comprise computing the median intensity value of each super-pixel. The method may comprise computing the mode intensity value of each super-pixel. The method may comprise computing the entropy of each super-pixel.

The method may comprise forming a feature vector for each super-pixel. The feature vector may be a one-dimensional feature vector. The feature vector may be a 14×1 feature vector. The feature vector may include any and/or all of the following: the cross-correlation of the super-pixel with the filter, the number of ridges present in the super-pixel, the ratio of non-zero value to zero value pixels, the aspect ratio of the dimensions, the ratio of perimeter over area, ratio of convex hull over perimeter, the variance in intensity, the median intensity value, the mode intensity value, the entropy value, the contrast value, the correlation value, the energy yield value, and/or the homogeneity value.

The method may comprise feeding each feature vector into the machine learning algorithm. The method may comprise using the machine learning algorithm to identify super-pixels which contain part of the latent print. The method may comprise building the image of the latent print on the curved surface from super-pixels identified as containing part of the latent print. Building the image of the latent print may comprise mosaicking super-pixels identified as containing part of the latent print.

One or more of the steps may be carried out in a sequential order. Each step may be carried out in a sequential order. The method may automatically move along the sequential order.

DETAILED DESCRIPTION OF THE INVENTION

In order that the invention may be more clearly understood one or more embodiments thereof will now be described, by way of example only, with reference to the accompanying drawings, of which:

Figure 1:
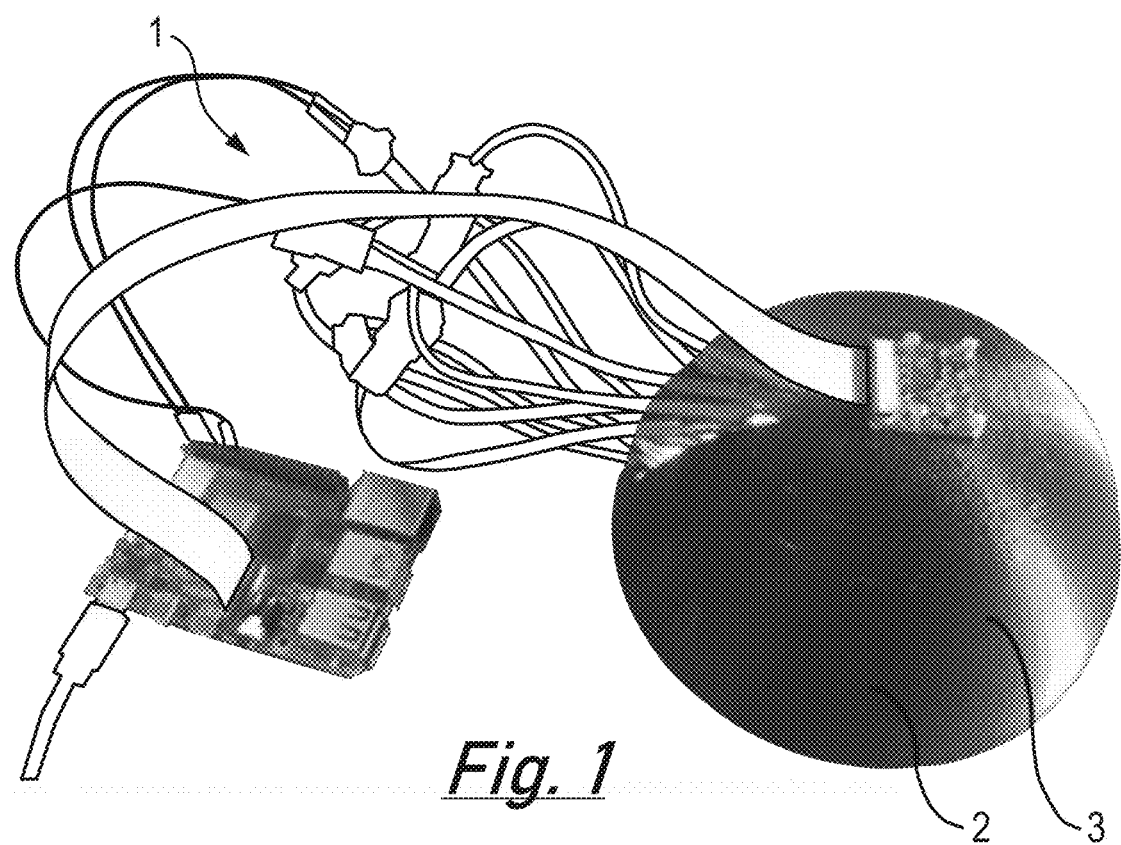
FIG. 1 shows a latent print extraction apparatus.
Figure 2:
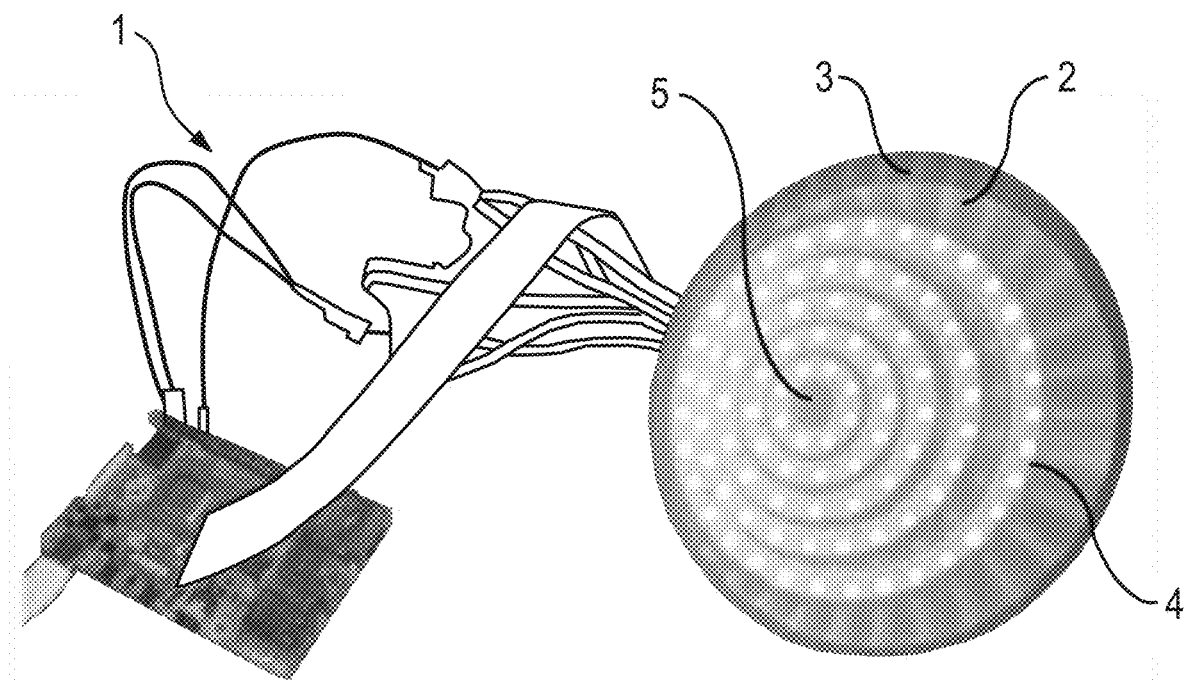
FIG. 2 is a second view of the latent print extraction apparatus of FIG. 1.

As shown in FIGS. 1 and 2, the latent print extraction apparatus 1 comprises a lighting dome 2. The lighting dome 2 comprises a dome shell 3. Housed within the dome shell 3 is a plurality of rings of LEDs 4, each ring of LEDs 4 positioned at a different level within the lighting dome 2. The outer edges of the rings of LEDs 4 are attached to the inner surface of the dome shell 3, with the centre of each ring of LEDs 4 aligned with the apex of the lighting dome 2. Each ring of LEDs 4 is a single LED thick, and the LEDs are spaced out evenly around the respective ring of LEDs 4. Each ring of LEDs 4 has a different diameter and accordingly different number of LEDs. The higher the level of the ring of LEDs 4 within the lighting dome, the smaller its diameter and the fewer its number of LEDs. The LEDs of the rings of LEDs 4 face towards the open end of the lighting dome 2, directing their light out the bottom of the lighting dome 2.

The lighting shell 3 also holds a camera 5 within, positioned at the apex of the lighting dome 2. The camera faces the open end of the lighting dome 2, to capture pictures of the scene out of the bottom of the lighting dome 2. The camera 5 is positioned in line with the centres of the rings of LEDs 4, and faces along a line through these centres.

Figure 3:
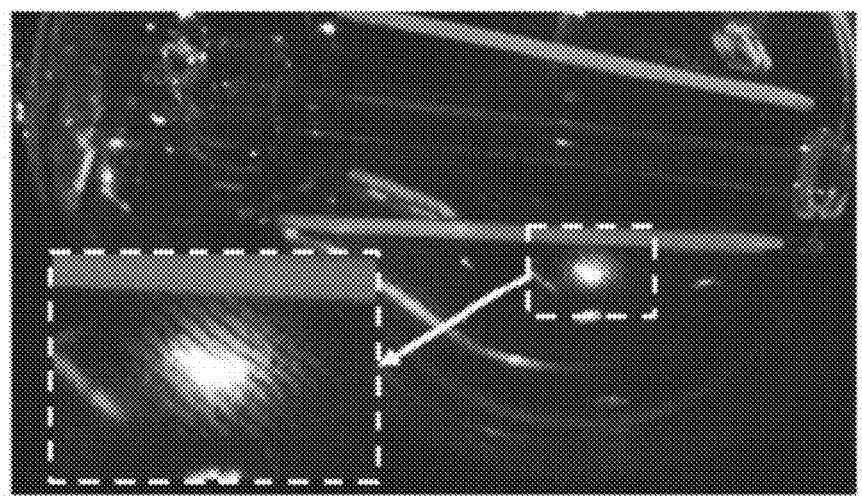
FIG. 3 shows a part of a curved surface of a lightbulb, with a zoomed in section showing a latent print on said surface.

In use, the lighting unit 2 is placed over a curved surface, such as the curved surface shown in FIG. 3. The open end of the lighting unit 2 is placed on or over the curved surface, facing the surface and covering an area of the surface upon which a latent print resides. The camera 5 then captures multiple images of the area. For each image, a different LED of the rings of LEDs 4 is turned on. The latent print extraction apparatus 1 thereby carries out multi-light imaging. The latent print extraction apparatus 1 captures 80 multi-light images. The camera 5 also captures an image of the area for which all of the LEDs for only one of the rings of LEDs 4 are turned on, such that the image is of the area showing a reflection of a ring of light.

Figure 4:
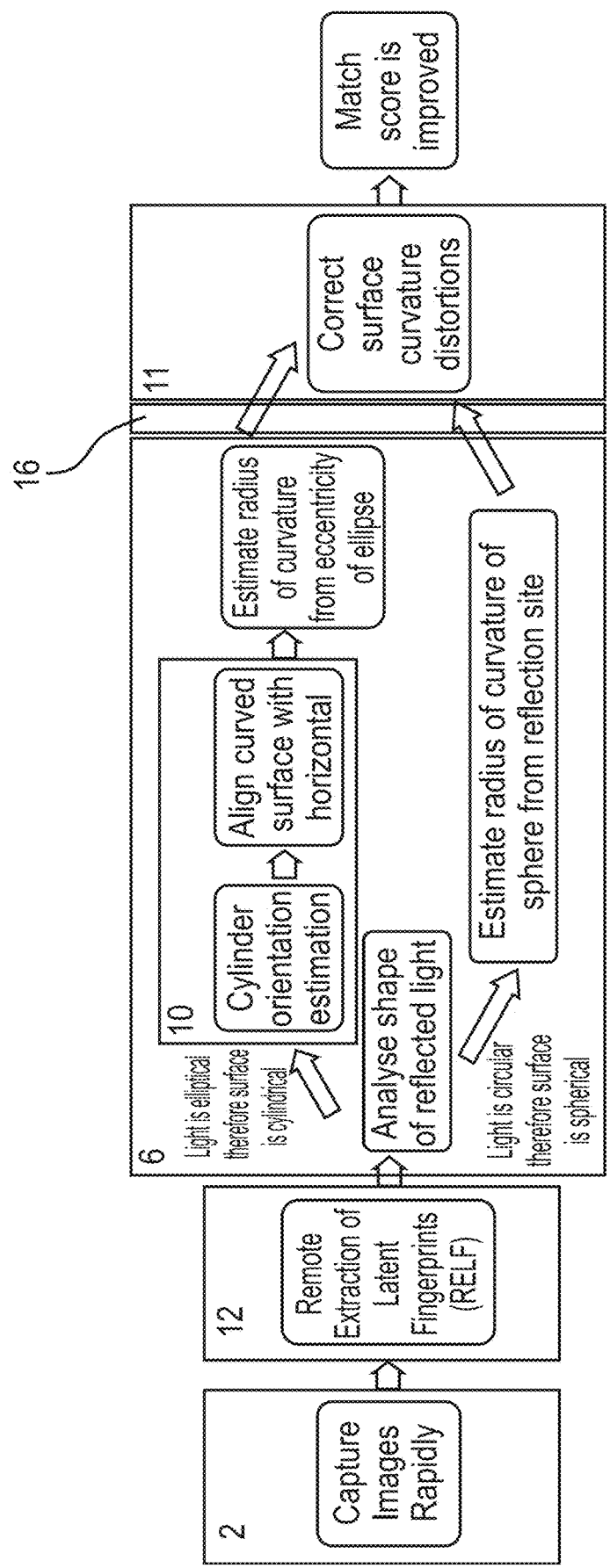
FIG. 4 is a flowchart of the latent print extraction apparatus.

As shown in FIG. 4, the lighting unit 2 captures the multi-light images and the image of the reflected ring of light and passes them via an input to a comparison unit 6. The comparison unit 6 fits an ellipse 7 to the reflected ring of light, using the ellipse formula:

$$ax^2 + bxy + cy^2 + dx + ey + f = 0$$

Figure 5:
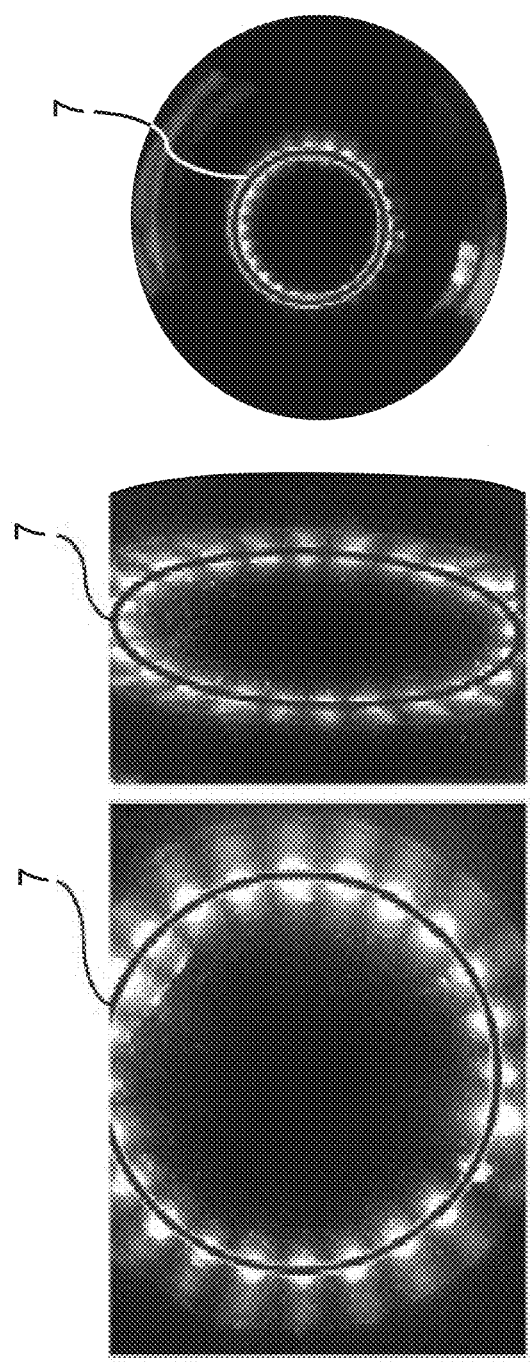
FIG. 5 shows images of a ring of light reflected from (from left to right) a flat surface, a cylindrical surface, and a spherical surface.

FIG. 5 shows examples of the resulting images.

The comparison unit 6 then calculates the eccentricity of the fitted ellipse 7. The comparison unit 6 does this by first computing the semi-major and semi-minor axes 8, 9 of the ellipse (A and B, shown in FIG. 6), using the following equations:

$$A = \frac{-\sqrt{2(ae^2 + cd^2 - bde + (b^2 - 4ac)f)((a+c) - \alpha)}}{b^2 - 4ac}$$

$$B = \frac{-\sqrt{2(ae^2 + cd^2 - bde + (b^2 - 4ac)f)((a+c) - \alpha)}}{b^2 - 4ac}$$

Wherein A is the semi-major axis, B is the semi-minor axis, and $\alpha = \sqrt{(a-c)^2 + b^2}$.

Once the semi-major and semi-minor axes 8, 9 are computed, the comparison unit 6 calculates the eccentricity of the ellipse 7 based on the following formula:

$$e_0 = \sqrt{1 - \frac{B^2}{A^2}}$$

As shown in FIG. 5, on a flat or spherical surface the eccentricity of the ellipse 7 is zero and so the ellipse 7 is a circle. On a cylindrical surface the eccentricity of the ellipse 7 is non-zero, the ellipse 7 being an oval. Given this, from the calculated eccentricity the comparison unit 6 can determine if the curved surface is cylindrical or spherical.

If the comparison unit 6 determines the surface is cylindrical (i.e. the eccentricity is non-zero), an orientation unit 10 determines the orientation of the curvature of the cylindrical surface based on the orientation formula:

$$\theta = \tan^{-1}\left(\frac{c - a - \sqrt{(a-c)^2 + b^2}}{b}\right)$$

wherein θ angle of the direction of the curvature of the curved surface which respect to the horizontal of the image, and a, b, and c are parameters of the ellipse 7.

Once the orientation is determined, the orientation unit 10 orientates the image of reflected light and an image of the latent print on the curved surface based on the determined orientation so that the horizontal of the images align with the curvature of the curved surface.

Figure 7:
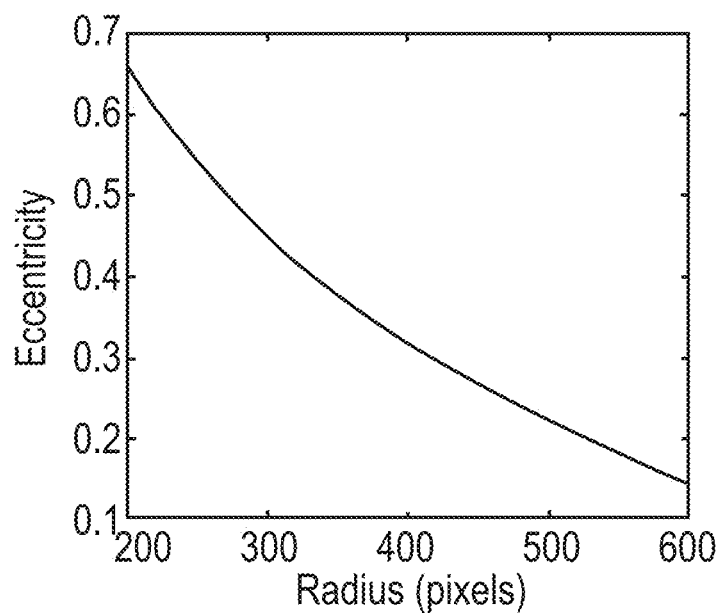
FIG. 7 is a graph of eccentricity of an ellipse fitted to a ring of light reflected from a cylindrical surface versus radius of the curvature of the cylindrical surface.

Further to this, the comparison unit 6 compares the calculated eccentricity to a graph of eccentricity versus radius of curvature, an example of which is shown in FIG. 7, thereby comparing the shape of the reflected light on the curved surface to the expected shape of light reflected from a flat surface given the key difference is that the eccentricity is non-zero. From this comparison, the comparison unit 6 can estimate the curvature of the cylindrical surface.

If the comparison unit 6 determines the surface is spherical (i.e. the eccentricity is zero), the comparison unit 6 calculates the radius of the ellipse 7. As shown in FIG. 5, a spherical surface results in the reflected ring of light having a smaller radius than a ring of light reflected from a flat surface, and the exact size is dictated by the curvature of the sphere (the larger the curvature of the sphere, the smaller the reflected ring). As such, the comparison unit 6 compares the calculated radius to the radius of the expected ellipse if the surface where flat, and from this comparison determines an estimation for the curvature of the sphere.

Figure 6:
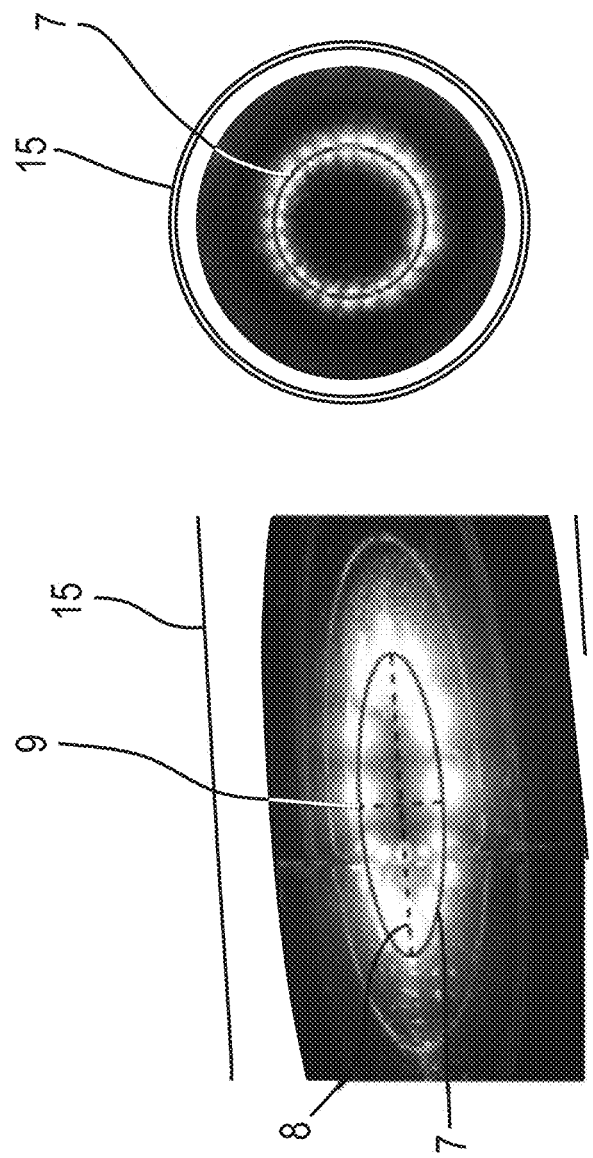
FIG. 6 shows further images of a ring of light reflected from (from left to right) a cylindrical surface and a spherical surface.

The latent print extraction apparatus 1 also comprises a boundary estimation unit 16. Once the curvature estimation is complete, the boundary estimation unit 16 analyses the image of the reflected ring of light and determines where the boundaries 15 of the surface reside within the image, as shown in FIG. 6.

Figure 14:
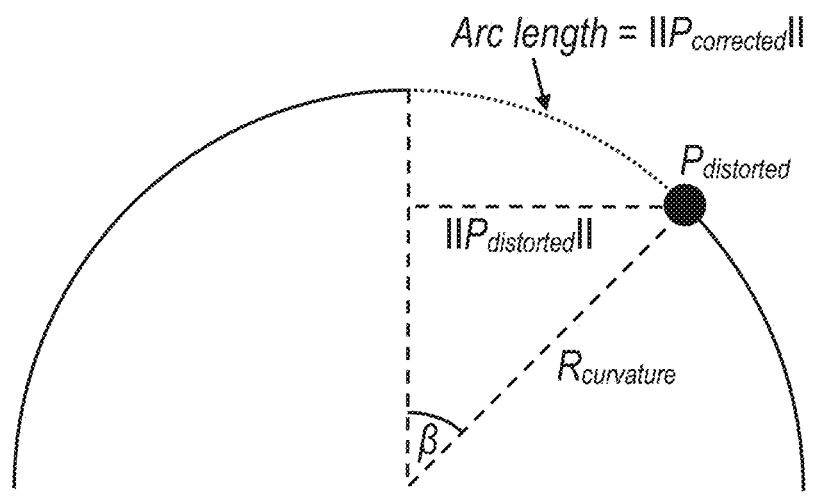
FIG. 14 is a diagram of a cross-section of the top half of a cylindrical surface.

Once the curvature of the surface and boundaries are estimated, a correction unit 11 corrects curvature distortions in the image of a latent print on the curved surface based on the estimated curvature. If the curved surface was found to be cylindrical, the correction unit 11 applies a cylindrical correction formula to every point in the image:

$$P_{cylindrical\,corrected} = R_{curvature} \sin^{-1}\left(\frac{P_{cylindrical\,distorted}}{R_{curvature}}\right)$$

wherein $P_{cylindrical\,distorted}$ is a position of the point in the image of the latent print on the curved surface, $R_{curvature}$ is the estimated curvature of the curved surface, and $P_{cylindrical\,corrected}$ is the new position of the point in the corrected image of the latent print on the curved surface. As shown in FIG. 14, $P_{cylindrical\,distorted}$ is the perpendicular distance between the point in the image and a central line down the length of the image of the cylindrical surface, while $P_{cylindrical\,corrected}$ is the arc length between the point and the central line down the length of the image of the cylindrical surface. The position within the image of the central line is determined based on the estimated boundaries of the surface, the central line being the mid-line between (and parallel to) the long sides of the boundary.

If alternatively the curved surface was found to be spherical, the correction unit 11 applies a pincushion distortion to the image of the latent print, applying the spherical correction formula to every point in the image:

$$P_{spherical\,corrected} = P_{spherical\,distorted}(1 + kP_{spherical\,distorted}^2)$$

wherein $P_{spherical\,corrected}$ is the position of the point relative to the centre of the curved surface in the corrected image, $P_{spherical\,distorted}$ is the position of the point relative to the centre of the curved surface in the image, and k is the distortion parameter which is inversely proportional to the radius of the of curvature. The centre of the curved surface in the image is determined based on the boundary estimation, wherein the centre is the point equidistant from all points of the circular boundary.

Figure 8:
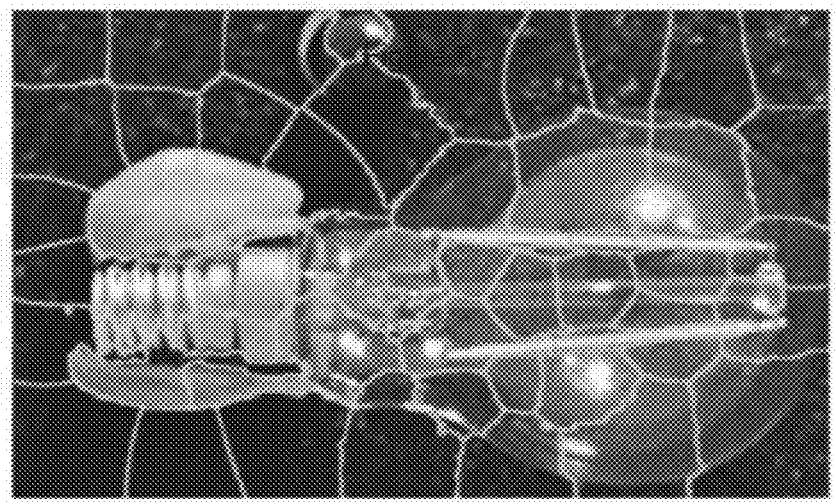
FIG. 8 is an image of a curved surface obtained via multi-light imaging, segmented into super-pixels.

Prior to carrying out the curvature estimation and correction, the latent print extraction apparatus 1 generates an image of the latent print from the multi-light images. To generate the image of the latent print on the curved surface, the latent print extraction unit 1 feeds the captured multi-light images into an image analysis unit 12. The image analysis unit segments each multi-light image into super-pixels, as shown in FIG. 8. The image analysis unit 12 then performs a fast Fourier transform (FFT) on each super-pixel. The image analysis unit 12 can then obtain a value for the dominant frequency in the super-pixel.

Figure 9:
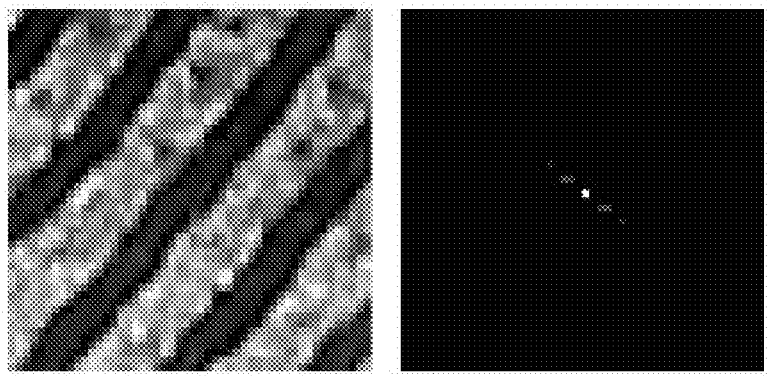
FIG. 9 is (from left to right) a portion of a fingerprint and the same portion in the frequency domain.
Figure 10:
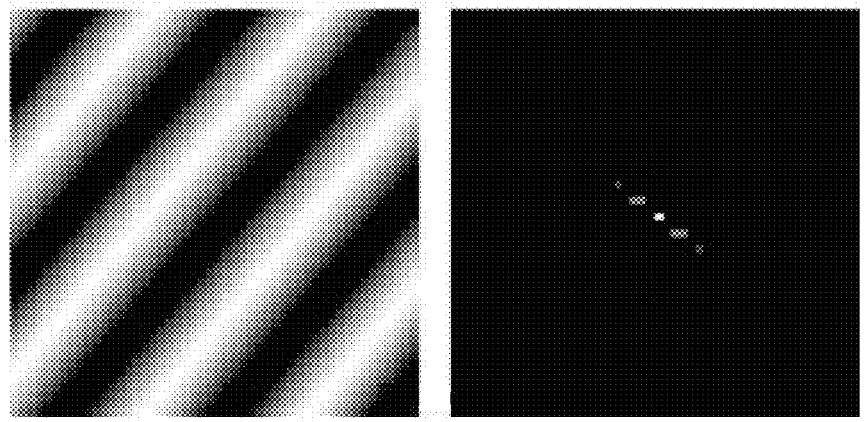
FIG. 10 is (from left to right) a sinusoidal filter and the same filter in the frequency domain.

The image analysis unit 12 measures the orientation of the dominant frequency with respect to the horizontal of the respective multi-light image. The image analysis unit 12 then generates a filter corresponding to the dominant frequency and its orientation. When the super-pixel contains part of the latent print, typically the filter generated is a sinusoidal filter given the similarities of the sinusoidal filter and its frequency domain counterpart to part of the latent print and its frequency domain counterpart (as shown from a comparison of FIGS. 9 and 10). The image analysis unit 12 then carries out a cross-correlation between the generated filter and the respective super-pixel. A high cross-correlation indicates the super-pixel contains a portion of the latent print, while a low cross-correlation indicates that it does not. This is due to the fact that any super-pixel containing part of a latent print with typically have the pattern of ridges in the super-pixel as its dominant frequency, and the overall pattern of the super-pixel will typically strongly adhere to the pattern of ridges. In contrast, for super-pixels without part of the latent print therein typically the super-pixel does not adhere to any pattern to a particularly strong degree.

At the central region of a latent print the ridges of the print have a greater curvature. This greater curvature means that a super-pixel containing part of a central region of the latent print can be found to have a low cross-correlation. To avoid this issue, the image analysis unit 12 segments the multi-light images into a high enough number of super-pixels (i.e. the size of each individual super-pixel is reduced) such that the curvature present in each super-pixel containing part of the central region is minimised. The super-pixels containing part of the central region then do have a high cross-correlation with the respective filter.

The image analysis unit 12 also orientates the super-pixel such that the direction of any dominant frequency (i.e. the direction of the pattern of ridges of any part of the latent print present in the super-pixel) is aligned with the horizontal of the multi-light image. It then counts the number of peaks along this direction, and thereby computes a value for the number of ridges in the super pixel.

The image analysis unit 12 then computes the gray-level co-occurrence matrix (GLCM) for each super-pixel—the histogram of co-occurring grayscale values at a given offset across each super-pixel. The image analysis unit 12 extracts the following values from the GLCM:

- the contrast, which is the intensity contrast between a pixel and its neighbour over the whole super-pixel;
- the GLCM correlation, which is the correlation between a pixel and its neighbour over the whole super-pixel;
- the energy yield, which is the sum of the squared elements within the GLCM; and
- the homogeneity, which is the closeness of elements in the GLCM to the GLCM diagonal.

The image analysis unit 12 also computes the following for each super-pixel:

- the ratio of non-zero to zero value pixels in the super-pixel;
- the aspect ratio of super-pixel dimensions, by calculating the super-pixel height and width then dividing the smallest of these dimensions by the largest;
- the ratio of perimeter over area;
- the ratio of convex hull over perimeter of super-pixel, wherein the convex hull is the smallest possible convex polygon which contains all the points in a set of points on a plane;
- the variance in intensity across a super-pixel;
- the median intensity value of a super-pixel;
- the mode intensity value of a super-pixel; and
- the entropy of a super-pixel.

The image analysis unit 12 then forms a 14×1 feature vector comprising these calculated values, the values extracted from the GCLM, the number of ridges and the cross-correlation of the super-pixel with the filter. A respective feature vector for each super-pixel is fed into a machine learning algorithm via the image analysis unit 12, and it uses the machine learning algorithm to determine, based on the feature vector, whether each super-pixel contains a part of the latent print or not. Such a determination can be based on the features of the feature vector, as set out below.

A high cross-correlation means there is a high degree of similarity between the FFT of the super-pixel and a sinusoidal filter, and since a pattern of ridges is similar to a sinusoidal filter a high cross-correlation indicates the presence of ridges of the latent print within the super-pixel. The presence of a number of ridges indicates the presence of part of a latent print.

The ratio of non-zero to zero value pixels in a super-pixel indicates the saturation of a super-pixel. The more saturated a super-pixel is, the more likely part of a latent print is present in the super-pixel, since the pattern of light and dark pixels caused by the presence of a part of a latent print will result in a higher ratio.

Specular reflections (e.g. light reflecting from a part of the latent print) from curved surfaces are often elongated and their dimensions are highly dissimilar. As such, a large aspect ratio of a super-pixel indicates the super-pixel contains part of a latent print.

Super-pixels, given they are grouping of similar pixels, will typically adhere at least partly to object boundaries. This being the case, super-pixels with at least part of the latent print within are more likely to have large, meandering perimeters as they adhere to at least part of the perimeter of the latent print. In contrast, largely empty super-pixels (e.g. those which do not contain any, or contain little, of the latent print) will have smaller, largely circular perimeters. A high ratio of perimeter over area of super-pixel indicates part of a latent print is within the super-pixel.

Figure 11:
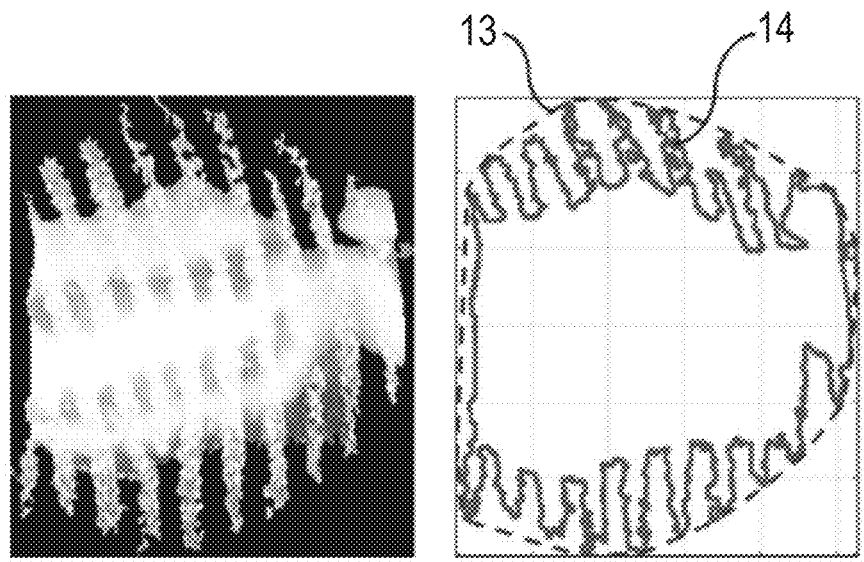
FIG. 11 is (from left to right) an image of a super-pixel containing part of a latent print and an image of the convex hull and perimeter of the super-pixel.

As shown in FIG. 11, the perimeter 13 is typically larger than the convex hull 14 when the super-pixel contains part of a latent print. In contrast, when a super-pixel does not contain part of a latent print there is typically less texture in the super-pixel, and so the perimeter and convex hull are more similar. Given this, a high ratio of convex hull to perimeter indicates a super-pixel contains part of a latent print.

As can also be seen from FIG. 11, the presence of part of a latent print within a super-pixel typically means the intensity values of pixels across the super-pixel to vary more from the average intensity of the super-pixel, compared to super-pixels without part of a latent print within. Therefore, a high variance in intensity across a super-pixel indicates the presence of part of a latent print within the super-pixel.

The reflections of light off the latent print mean that super-pixels with part of the latent print within tend to have a higher average of pixel intensity value that super-pixels which do not contain any part of the latent print. This being the case, higher median and mode intensity values of a super-pixel indicate the presence of part of a latent print within the super-pixel. The median and mode values are more useful as an indication than the mean, since both are impacted less by outlying bright spots in overall dark super-pixels. Such bright spots can be found in super-pixels, regardless of whether they contain part of a latent print.

The entropy of a super-pixel indicates the randomness of intensity in the distribution of a super-pixel. Given a part of a latent print will form a pattern in the intensities of the super-pixel, and typically super-pixels without a part of the latent print within will have little to no patterns in the intensities, a low entropy indicates the presence of part of the latent print within the super-pixel.

The machine learning algorithm is a two-layer feed-forward artificial neural network, which is trained to learn from 251,154 super-pixel feature vectors (for each of which it is known whether they contain part of a latent print or not), wherein 0.6% of these super-pixels contain part of a latent print. The training super-pixels are drawn from 13 sets of multi-light images, each set of multi-light images being a set of the order of 80 images and each set being of a surface with a different specularity and/or colour. 70% of the training feature vectors are used to train the network using Bayesian regularisation, to update the weights and biases according to Levenberg-Marquardt optimisation, minimising squared errors and weights resulting in a network with good generalisation (i.e. a good ability to handle unseen data). 15% of the training feature vectors are used for validation in order to measure the generalisation of the network, and to stop the training when generalisation ceases to improve. The final 15% is also used for testing, to allow for independent evaluation.

The trained machine learning algorithm identifies which feature-vectors indicate the presence of part of a latent print. The image analysis unit 12 then mosaics the corresponding super-pixels together to form the image of a latent print on a curved surface. Each corresponding super-pixels is placed in the position in the mosaic which corresponds to its position in the respective multi-light image, with super-pixel's sharing the same position overlaying each other (or which share part of the same position overlaying each other for the points they share).

Once the image of the latent print is generated, the latent print extraction apparatus 1 carries out the comparison and correction as set out above. The corrected image of the latent print on the curved surface can then be compared to known latent prints to determine if it matches any, including comparing the corrected image of the latent print on a curved surface to latent print databases and/or running it through latent print matching software. The latent print extraction apparatus 1 is operable to automatically move from each completed step to the respective subsequent step. Once the latent print extraction apparatus 1 generates the image of the latent print, it automatically begins the comparison step and then automatically begins the correction step once the comparison step is completed. It then automatically compares the corrected image of the latent print on a curved surface to latent print databases and/or runs it through latent print matching software once the correction step is complete.

Figure 12:
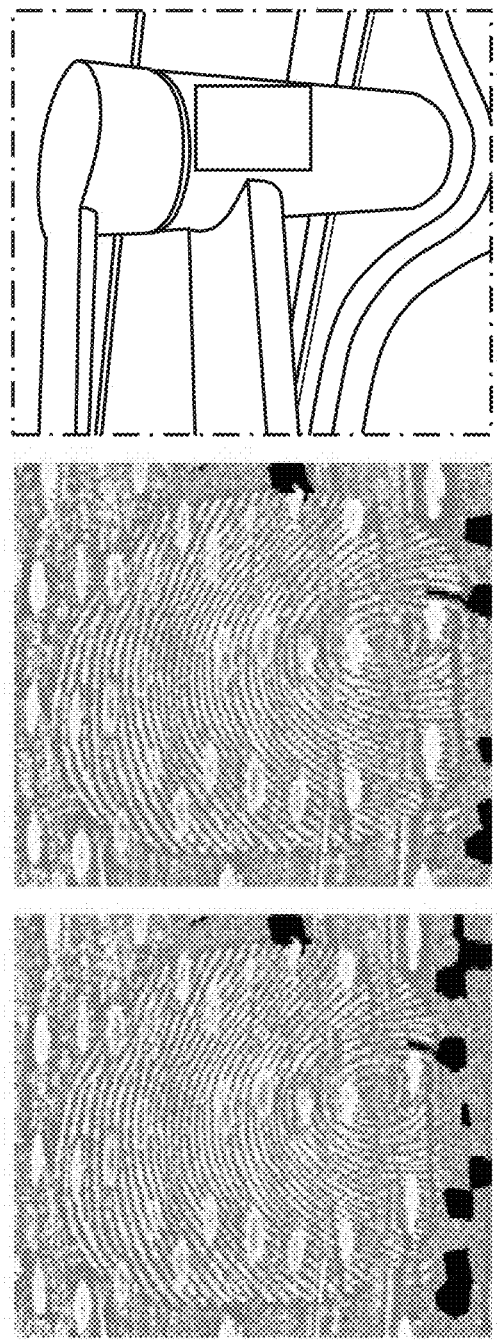
FIG. 12 is (from left to right) an image of a latent print from a cylindrical surface, a corrected image of the latent print from the cylindrical surface, and an image of the cylindrical surface.
Figure 13:
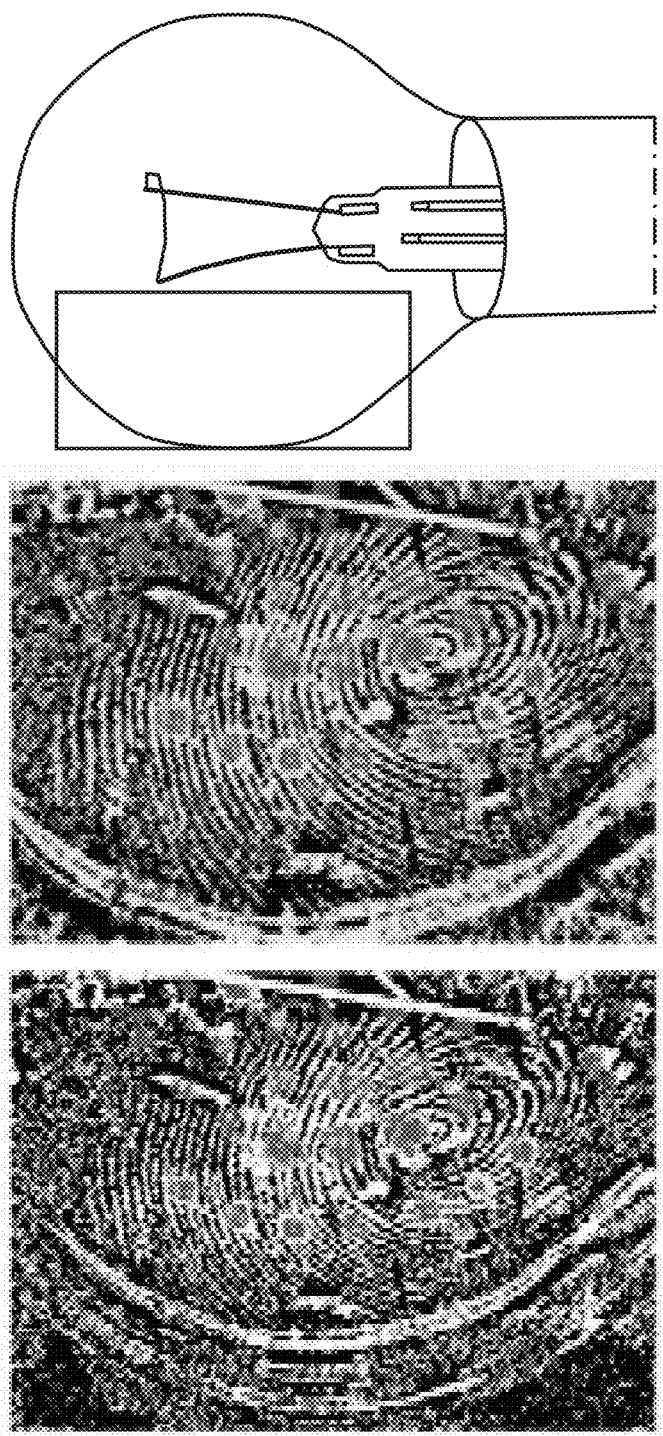
FIG. 13 is (from left to right) an image of a latent print from a spherical surface, a corrected image of the latent print from the spherical surface, and an image of the spherical surface.

The corrected images of latent prints on curved surfaces shown in FIGS. 12 and 13, can be run through the NBIS. When the corrected images of latent prints on curved surfaces shown in FIGS. 12 and 13 where run through NBIS and compared to the same, clearly defined print, the resulting matched scores were 56 and 30, respectively. In contrast, when the uncorrected images of latent prints on curved surfaces in FIGS. 12 and 13 where run through NBIS and compared to the same, clearly defined print, the resulting matched scores were lower, at 44 and 25, respectively. As such, correcting the images for curvature distortions using the latent print extraction apparatus 1 improves the degree of confidence in matches between the latent print and known prints.

The one or more embodiments are described above by way of example only. Many variations are possible without departing from the scope of protection afforded by the appended claims.

The invention claimed is:

1. A latent print extraction apparatus comprising:
   an input operable to receive an image of light reflected from a curved surface;
   a comparison unit operable to compare a shape of the reflected light in the image to an expected shape of light reflected from a flat surface and thereby determine an estimated curvature for the curved surface; and
   a correction unit operable to correct curvature distortions of an image of a latent print on the curved surface based on the estimated curvature.

2. The latent print extraction apparatus according to claim 1 comprising a lighting unit operable to apply light to the curved surface.

3. The latent print extraction apparatus according to claim 2 wherein the lighting unit is operable to generate light with a circular profile.

4. The latent print extraction apparatus according to claim 3 wherein the lighting unit is operable to generate light with a ring profile.

5. The latent print extraction apparatus according to claim 2 wherein the lighting unit comprises a light dome.

6. The latent print extraction apparatus according to claim 5 wherein the light dome is handheld.

7. The latent print extraction apparatus according to claim 2, wherein the lighting unit comprises a plurality of rings of light sources.

8. The latent print extraction apparatus according to claim 7, comprising a camera operable to capture the image of light reflected from the curved surface, and wherein the camera is directed to be operable to capture images wherein a centre of the images aligns with a centre of the ring of light sources.

9. The latent print extraction apparatus according to claim 1, comprising an orientation unit operable to determine an orientation of the curvature of the curved surface, and wherein the orientation unit is operable to orientate the image of the latent print on the curved surface based on the determined orientation so that the horizontal of the image of the latent print on the curved surface aligns with the curvature of the curved surface.

10. The latent print extraction apparatus according to claim 1, comprising a boundary estimation unit operable to estimate the boundary of the curved surface within the image of the latent print on the curved surface.

11. The latent print extraction apparatus according to claim 1, wherein the correction unit is operable to apply a spherical correction formula to the image of the latent print on the curved surface, the spherical correction formula being as follows:

$$P_{spherical\ corrected} = P_{spherical\ distorted}(1 + kP_{spherical\ distorted}^2)$$

wherein $P_{spherical\ corrected}$ is the position of the point relative to the centre of the curved surface in the corrected image, $P_{spherical\ distorted}$ is the position of the point relative to the centre of the curved surface of the latent print, and k is the distortion parameter which is inversely proportional to the radius of the curvature.

12. The latent print extraction apparatus according to claim 11, wherein $P_{spherical\ corrected}$ is a distance between the point and the centre of the curved surface in the corrected image and $P_{spherical\ distorted}$ is a distance between the point and the centre of the curved surface in the image.

13. A latent print extraction apparatus, comprising:
an input operable to receive an image of light reflected from a curved surface;
a comparison unit operable to compare a shape of the reflected light in the image to an expected shape of light reflected from a flat surface and thereby determine an estimated curvature for the curved surface;
a correction unit operable to correct curvature distortions of an image of a latent print on the curved surface based on the estimated curvature; and
wherein the comparison unit is operable to calculate the eccentricity of the shape of the reflected light.

14. The latent print extraction apparatus according to claim 13 wherein the comparison unit is operable to compare the calculated eccentricity to a table and/or graph of eccentricity versus radius of curvature of a surface to determine the estimated curvature of the curved surface, to thereby compare the shape of the reflected light to the expected shape of light from a flat surface.

15. The latent print extraction apparatus according to claim 14 wherein the comparison unit is operable to compare the calculated eccentricity to the table and/or graph when the calculated eccentricity is not equal to zero.

16. The latent print extraction apparatus according to claim 13, wherein the comparison unit is operable to determine the radius of the shape of the reflected light.

17. The latent print extraction apparatus according to claim 16, wherein the comparison unit is operable to determine the radius of the shape of the reflected light when the calculated eccentricity is equal to zero, or wherein the comparison unit is operable to compare the determined radius to the expected radius of the shape of the light when reflected from a flat surface to determine the estimated curvature of the curved surface.

18. The latent print extraction apparatus according to claim 13, wherein the correction unit is operable to apply a cylindrical correction formula to each point in the image of the latent print on the curved surface, the cylindrical correction formula being as follows:

$$P_{cylindrical\ corrected} = R_{curvature}\sin^{-1}\left(\frac{P_{cylindrical\ distorted}}{R_{curvature}}\right)$$

$P_{cylindrical\ distorted}$ position of the point in the image of the latent print on the curved surface, $R_{curvature}$ is the estimated curvature of the curved surface, and $P_{cylindrical\ corrected}$ is the new position of the point in the corrected image of the latent print on the curved surface and wherein the correction unit is operable to apply the cylindrical correction formula when the calculated eccentricity is not equal to zero.

19. The latent print extraction apparatus according to claim 18, wherein $P_{cylindrical\ distorted}$ is a length of a line running from the point in the image to a central line along a length of the image of the cylindrical surface, the line being perpendicular to the central line, and $P_{cylindrical\ corrected}$ is the length of a line running from the point in the corrected image to a central line along a length of the image of the cylindrical surface, the line being perpendicular to the central line.

20. A method of latent print extraction, comprising the steps of:
receiving an image of light reflected from a curved surface;
comparing a shape of the reflected light in the image to an expected shape of light reflected from a flat surface and thereby determining an estimated curvature for the curved surface; and
correcting curvature distortions of an image of a latent print on the curved surface based on the estimated curvature.

* * * * *